United States Patent [19]

Akao et al.

[11] 4,436,809

[45] Mar. 13, 1984

[54] METHOD FOR LIGHT-SHIELDING A ROLL PHOTOGRAPHIC FILM

[75] Inventors: Mutsuo Akao; Tadashi Kawata, both of Kanagawa, Japan

[73] Assignee: Fuji Photo Film Co., Ltd., Kanagawa, Japan

[21] Appl. No.: 318,894

[22] Filed: Nov. 6, 1981

Related U.S. Application Data

[62] Division of Ser. No. 141,533, Apr. 18, 1979, abandoned.

[51] Int. Cl.³ .......................... G03C 3/02; B32B 7/02

[52] U.S. Cl. .................................. 430/501; 428/207; 428/209; 428/211; 428/215; 430/524; 430/538

[58] Field of Search ............... 428/213, 464, 537, 204, 428/207, 208; 430/501, 524, 538

[56] References Cited

U.S. PATENT DOCUMENTS

| | | | |
|---|---|---|---|
| 3,514,290 | 5/1970 | Hoof | 430/501 |
| 3,684,206 | 8/1972 | Edwards | 430/501 X |
| 4,131,518 | 12/1978 | Fromson | 428/464 X |
| 4,233,195 | 11/1980 | Mills | 427/180 X |

*Primary Examiner*—Thomas J. Herbert, Jr.
*Attorney, Agent, or Firm*—Sughrue, Mion, Zinn, Macpeak & Seas

[57] ABSTRACT

A method for light-shielding a roll photographic film wherein a backing paper comprising a support, a print layer and at least one aluminum layer on the support is employed.

16 Claims, 16 Drawing Figures

METHOD FOR LIGHT-SHIELDING A ROLL PHOTOGRAPHIC FILM

This is a division of application Ser. No. 141,533, filed Apr. 18, 1979, now abandoned.

BACKGROUND OF THE INVENTION

1. Field of the Invention

This invention relates to backing paper for roll film, and more particularly to backing paper for roll film having improved light-shielding properties, moisture resistance, dimensional stability, and so forth.

2. Description of the Prior Art

Light-shielding papers usually used include black-colored paper, paper including a colored paper layer, and paper produced by providing a light-shielding layer on a sheet of paper having no or insufficient light-shielding properties. They are provided with letters or figures for indication of their functions or printed to increase their product values. In some cases, a protective layer may be provided on one or both surfaces of the light-shielding paper.

These light-shielding papers are used in various forms, for example, as wrapping paper for light sensitive photographic material and backing paper for roll films. This invention is directed to backing paper for roll films, which is hereinafter referred to merely as "backing paper".

This backing paper is overlaid on a given length of photographic film and wound around a core, or when a core is not used, it is wound up and placed in an appropriate size holder. The backing paper has a limited thickness because its length is fixed; for instance, the standard for thickness could be 0.10 (+0.02, −0.01) mm using JIS K-7512-1961, 0.0041(±0.0006) inch under American National Standard PH 1.21-1972, or 0.1 (+0.02, −0.01) mm under DIN 4523 Teil 1.

Referring to FIGS. 15 and 16, conventional backing papers are generally provided with light-shielding properties by incorporating carbon black or yellow pigment in a support 3' or by providing a protective layer 1' containing carbon black or yellow pigment on the support 3'. In these figures, the reference numerals 1 and 2 indicate a protective layer and a print layer, respectively.

Japanese Patent Publication No. 49205/76 discloses a backing paper produced by providing on at least one side of paper a film of a copolymer of ethylene and at least one of acrylate ester and methacrylate ester in which carbon black has been dispersed; Japanese Patent Application (OPI) No. 150016/77 ("OPI" indicates a published unexamined Japanese patent application) discloses a backing paper produced by providing a carbon black-dispersed light-shielding layer on a white support; and in U.S. Defensive Publication No. T871,004 a backing paper is disclosed produced by providing a plurality of carbon black layers on a paper support.

These conventional backing papers, however, have the following defects:

(1) When they are allowed to stand at high temperatures and humidities (for example, at 50° C. and 80% for 3 days), adhesion of the backing paper and the film occurs because of their insufficient moisture resistances.

(2) When they are allowed to stand in the air for a long period of time, fogging of the film occurs due to gases: this so-called gas fogging takes place because of their insufficient gas-shielding properties.

(3) For a backing paper consisting of a paper support and a plastic film layer, loose winding of film occurs (i.e., spaces occur between the successive layers of the rolled film) because of the backing paper's high bending strength, and therefore difficulties are encountered in fitting the roll into a camera.

(4) For a backing paper comprising mainly paper, the dimensional stability is low because of large elongation due to moisture.

SUMMARY OF THE INVENTION

An object of this invention is to provide a novel backing paper overcoming the drawbacks of conventional backing papers, particularly a backing paper which is excellent in flexibility, moisture resistance, gas-shielding properties, physical strength, tight winding properties, dimensional stability, print suitability, antistatic properties, etc., as well as in light-shielding properties, even when used as a thin layer.

It has now been found that the above object is attained by providing at least one aluminum layer on a support.

Therefore this invention provides a backing paper for roll film which comprises a support and at least one aluminum layer provided on the support.

Figure 1:
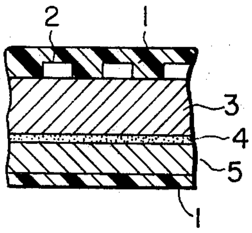
FIG. 1 is a cross-sectional view of an embodiment of backing papers for roll films according to the invention.

The reference numerals 1, 2, 3, 4 and 5 in the drawings indicate, respectively, (1) a protective layer, (2) a print layer, (3) a support, (4) an adhesive layer, and (5) an aluminum layer.

The reference numerals 1', 3' and 4' respectively indicate the layer in which the light-shielding agent is added to the layer of reference numerals 1, 3 and 4.

DETAILED DESCRIPTION OF THE INVENTION

It is generally known that with wrapping paper for light sensitive photographic material, for example, the provision of an aluminum layer, produces moisture resistance effect. However it has never been known that the aluminum layer has various characteristics as hereinafter described in addition to light-shielding properties and dimensional stability such that it is applicable to backing paper.

According to this invention, sufficient light-shielding properties are obtained without using carbon black or yellow pigment at all or by using them in greatly reduced amounts in comparison with conventional backing papers, by using an aluminum layer. By "aluminum layer" as used herein is meant a layer containing aluminum in any of several forms (e.g., aluminum foil, aluminum powder, etc.), as is explained in detail below. The details of this invention will become apparent from the following explanation with reference to the accompanying drawings.

FIG. 1 is an enlarged cross-sectional view of a typical embodiment of a backing paper according to this invention, in which the reference numerals 1, 2, 3, 4 and 5 indicate, respectively, (1) a protective layer, (2) a print layer, (3) a support, (4) an adhesive layer, and (5) an aluminum layer.

Any flexible sheet, such as conventionally used paper, plastic films, fabric, cellophane films, etc. can be used as the support 3. In general, a paper support is often used.

The paper support is preferably produced from kraft pulp, sulphite pulp or a mixture thereof, and half-bleached or non-bleached kraft pulp paper as well as normal bleached paper can be used. The support 3 may be non-colored, colored or partly colored, such as by adhering a colored support to a transparent support, and it may further contain carbon black, pigment, dye, etc., if desired.

The aluminum layer 5 can comprise aluminum foil; in addition, the aluminum layer can be an aluminum paste layer, an aluminum powder-dispersed layer, an aluminum vapor-deposited layer, etc. The addition of a light-shielding substance, such as carbon black, coloring pigment and coloring dye, to the aluminum paste layer or aluminum powder-dispersed layer increases the light-shielding properties and antistatic properties.

Of the aluminum paste and the aluminum powder, the aluminum paste is preferred. In the case of an aluminum paste, an aluminum powder is coated with, e.g., stearic acid, to prevent the possibility of an explosion and/or blocking, in which a flaked aluminum powder is condensed, while it is being prepared for use in an aluminum layer according to the invention.

The aluminum powders used for both the aluminum paste and the aluminum powder embodiments of the invention are flaked aluminum powders and essentially similar to each other. The diameter of the aluminum particles can range from about 1 to 350$\mu$, and preferably from 5 to 200$\mu$, and thickness of from about 0.1 to 0.6$\mu$. However, when the aluminum powder is used for the aluminum powder embodiment of the invention, the size of the powder can be made smaller, since it is difficult to condense the grains of the powder.

An aluminum paste is prepared in presence of a white split and of a small amount of a stearic acid in addition to an aluminum powder made according to ball mill method. Also, an aluminum powder can be prepared by shattering an aluminum foil, to form flaked aluminum powder, in addition to forming aluminum powder according to atomizing, granulation, revolution disk dropping method, an evaporation method, etc.

To disperse aluminum paste or aluminum powder as described above in a thermoplastic resin, the aluminum paste or aluminum powder can be added to the resin and stirred for mixing by known methods.

The aluminum vapor deposited layer embodiment of the invention can be formed using conventional methods by which a metal is vacuum-deposited. More particularly, a polycrystalline thin film can be prepared in accordance with a procedure wherein the aluminum is heated to become a vapor such as under vacuum conditions of about $10^{-4}$ torr. in a high-vacuum apparatus. The vapor is condensed in the atomic or molecular state on a cold deposited base located in proximity to the vaporized aluminum.

In the deposited layer, the layer may be used in the thickness of more than 500 Å when only the aluminum deposited layer is used. The aluminum deposited layer can be used in a thickness of less than 500 Å when other light-shielding materials are used together there with in the aluminum deposited layer.

These layers may be used alone or in combination with each other. Binders which can be used in dispersing aluminum include low density polyethylene, high density polyethylene, EEA (Ethylene-ethyl acrylate copolymer), EVA (Ethylene-vinyl acetate copolymer) and lacquer.

Preferred thicknesses are about 3$\mu$ to about 30$\mu$ in the case of the aluminum foil, about 5$\mu$ to about 100$\mu$ in the case of the aluminum paste layer, about 0.01$\mu$ to about 0.2$\mu$ in the case of the aluminum vapor deposited layer, and about 5$\mu$ to about 100$\mu$ in the case of the aluminum powder-dispersed layer. Of these layers, the use of an aluminum foil having a thickness of about 6$\mu$ to about 20$\mu$ is preferred with respect to light-shielding properties and production costs.

When the aluminum layer 5 is placed on the support 3, the adhesive layer 4 is provided between them. The material to be used in forming the adhesive layer 4 varies depending on the kind of the aluminum layer 5 and when the aluminum layer 5 is an aluminum foil, a neutral aqueous adhesive, a hot-melt adhesive (including wax), an extrusion-melt type adhesive comprising a thermoplastic resin, etc., are used.

Various coating methods can be used for providing the adhesive layer, including roll coating, air-knife coating, curtain coating and extrusion coating. The adhesive layer 4 can further contain light-shielding agents such as carbon black, pigment, and coloring dye, if desired.

When the aluminum layer 5 comprises aluminum powder or aluminum paste, the aluminum powder or aluminum paste is blended with a binder, such as polyethylene, etc., until a suitable aluminum content is obtained, and the resulting thermoplastic resin composition is coated on the support 3 by a coating procedure, such as extrusion coating or hot-melt coating.

Details are described in *Setchaku Binran* (*Handbook of Adhesives*), 11th Ed., published by Kobunshi Kanko Kai (1978).

The print layer 2 is a layer where letters and figures are printed for indication of functions or to increase the product value, and it is provided on the support 3, the reverse side of which is provided with the aluminum layer 5. This print layer 2 may, if desired, be provided on the aluminum layer 5, or may be provided on the protective layer 1, as explained below. With respect to the ink for the printing, ordinary inks can be used. Additionally, a reinforced ink can used, that is, an ink capable of providing print having good abrasion resistance and luster without the necessity of being covered with a protective layer 1.

A protective layer 1 is, if desired, provided on the outer layer to protect the print layer 2, aluminum layer 5 and support 3. Materials which can be employed to form the protective layer 1 include thermoplastic resins, such as polyethylene, etc., lacquer, varnish, etc. If desired, light-shielding agents such as carbon black, other pigments, dyes, etc., can be added thereto.

When a reinforced ink as described above is employed, the protective layer 1 need not be provided to protect the print layer 2.

Various coating methods can be employed to provide the protective layer 1, including, for example, reverse roll coating, blade coating, air knife coating and extrusion coating.

The thickness of the protective layer 1 is usually between about 0.5$\mu$ to 50$\mu$, although it may be varied depending upon the particular application.

Since the backing paper is overlaid on a given length of film and wound around a core, or, when no core is used, is wound up and placed in a holder, the total thickness of the backing paper is subject to certain limitations. In general, the total thickness of the backing paper should be from about 50μ to 150μ, and preferably is from 90μ to 120μ.

When a backing paper comprising a support 3 and at least one aluminum layer 5 provided on the support 3 is used as a backing paper for roll films, the following results can be obtained (in comparison with conventional backing papers):

(a) Light-shielding properties are markedly improved.
(b) Moisture resistance is improved.
(c) Gas-shielding properties are improved.
(d) Changes in dimension due to moisture are reduced.
(e) Good antistatic effect is obtained.
(f) Production costs are greatly reduced.

The reason that such excellent results are obtained is that the aluminum layer 5 itself possesses such characteristics. This will be more apparent from the examples illustrated below.

Although the above explanation has been made by reference to an embodiment of this invention, this invention is not limited thereto and various modifications are possible.

Further with regard to the layer construction of the backing paper of this invention, in addition to that illustrated in FIG. 1, various modified structures thereof can also be employed, wherein a desired number of various layers generally used in conventional backing papers are provided on the support.

These modified structures are illustrated in FIGS. 2 through 14, in which the reference numeral 1 is a protective layer; 1' is a protective layer having light-shielding properties; 2 is a print layer; 3 is a support; 3' is a support having light-shielding properties; 4 is an adhesive layer; 4' is an adhesive layer having light-shielding properties; and 5 is an aluminum layer.

The light-shielding properties of each of the protective layer 1', support 3' and adhesive layer 4' are, as described previously, provided by adding carbon black, other pigments, coloring dyes, etc., to the layer.

Each of the modified structures of FIGS. 2–14 is as illustrated in the figure, and no further explanation will be needed.

The following examples are given to illustrate this invention in greater detail.

The characteristics evaluated in the examples were measured by the following methods:

(1) Total Thickness of Backing Paper: The thickness was measured with a micrometer according to JIS-P8118-1976.

(2) Antistatic Properties: After predetermined processes, such as cutting and wrapping, the change in the quantity of charge was measured.

(3) Light-shielding Properties: The light-shielding properties against light of 80,000 lux was evaluated by the degree of fog formed on a highly sensitive photographic film.

(4) Permeability: The amount of water permeated through a sample was measured with a permeation cup according to JIS-Z0208-1976, in order to evaluate the moisture barrier characteristics of the backing paper.

(5) Bending Stiffness: The bending moment was measured by a stiffness test method of cardboard based on JIS P-8125-1976.

(6) Adhesion between Backing Paper and Film: The paper and film were laid out one upon the other, then wound up and allowed to stand for several days at 50° C. and 80% relative humidity; then the degree of adhesion between the emulsion surface of film and the printed surface was examined.

(7) Printing Properties: Properties of the finished print relating to printing characteristics, such as abrasion resistance (according to JIS P-8136-1976) and luster (according to JIS P-8142-1976), were totally evaluated, as follows: (i) Abrasion resistance (JIS P-8136-1976): The sample is placed on a plate which moves to the right and left periodically while it is rubbed its exposed surface by a stationary portion of the measuring apparatus for a set period of time. Then the degree of abrasion of the sample surface is measured. (ii) Luster (JIS P-8142-1976): Mirror plate luster is measured by a glossmeter arranged to receive light reflected at an angle of 75° from the perpendicular.

(8) Stretching Properties: The change in width of backing paper at different temperatures and humidities was measured with a comparator.

EXAMPLE 1

A backing paper according to this invention was prepared, and its characteristics were measured and compared with those of conventional backing papers.

Figure 2:
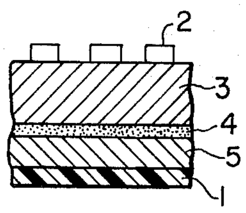
FIGS. 2 to 14 are cross-sectional views of other backing papers for roll films according to the invention.
Figure 3:
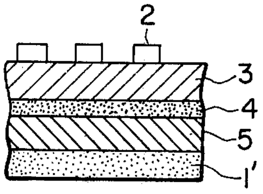

The backing paper of this invention had a layer construction as illustrated in FIG. 2, in which the support 3 was a white kraft paper having a thickness of 35μ and a basic weight of 35 $g/m^2$. The print layer 2 comprising a reinforced ink was provided on one surface of the support 3. The adhesive layer 4, comprising a thermoplastic resin, was provided in a thickness of 15μ by melt-extrusion coating onto the other surface of the support 3. The aluminum layer 5, comprising a 15μ thick aluminum foil, was bonded onto the adhesive layer 4, and a protective layer 1 for the aluminum layer 5 was provided by melt-extrusion coating a low density polyethylene layer at a thickness of 30μ.

Figure 15:
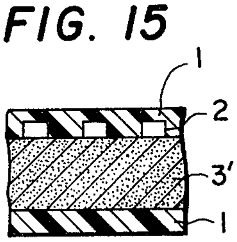
FIGS. 15 and 16 are cross-sectional views of conventional backing papers for roll films.
Figure 16:
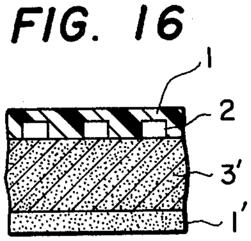

For comparison, Conventional Backing Paper Nos. 1 and 2, the construction of which are illustrated in FIGS. 15 and 16, respectively, were employed. In Backing Paper No. 1, the protective layer 1 comprised polymethyl methacrylate having a thickness of 2μ, and the support 3' having light-shielding properties was a 105μ thick black paper with 8% by weight of carbon added thereto. In Backing Paper No. 2, the protective layer comprised polymethyl methacrylate having a thickness of 2μ, the other protective layer 1' having light-shielding properties was a 20μ thick vinyl acetate copolymer containing 28.5% by weight carbon black, and the support 3' having light-shielding properties was a 83μ thick black paper containing 8% by weight carbon black.

The characteristics of these three backing papers were measured by the above described methods and compared. The results are shown in Table 1. In Tables 1–4 herein, the symbol ⊚ indicates that it is excellent, the symbol ○ indicates that it is usable, but just within the minimum limits, the symbol Δ indicates that it is not totally satisfactory, and the symbol X indicates that it is unsatisfactory.

These results confirm that the backing paper of this invention is excellent in such characteristics as antistatic properties, light-shielding properties, permeability, bending strength, printing properties, and stretching properties in comparison with Conventional Backing Paper Nos. 1 and 2.

TABLE 1

| | Backing Paper of This Invention | Conventional Backing Paper No. 1 | Conventional Backing Paper No. 2 |
|---|---|---|---|
| Layer Construction | Illustrated in FIG. 2 | Illustrated in FIG. 15 | Illustrated in FIG. 16 |
| Total Thickness (μ) | 95 | 110 | 105 |
| Antistatic Properties | ⊚ | ○ | Δ |
| Light-shielding Properties | ⊚ | ○ | ⊚ |
| Moisture Barrier Characteristics (g/m² 24 hours) | 0.8 | 1050 | 58 |
| Bending Stiffness (g · cm) | 1.0 | 6.1 | 2.1 |
| Adhesion between Film and Backing Paper after being allowed to stand at 50° C., 80% for 3 days | ⊚ | X | ○ |
| Printing Properties | ⊚ | ○ | ○ |
| Dimensional Stability | ⊚ | ○ | Δ |
| Cost Ratio | 70 | 70 | 100 |

EXAMPLE 2

Figure 5:
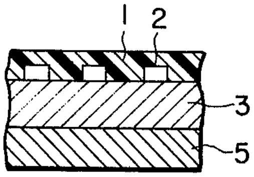
Figure 6:
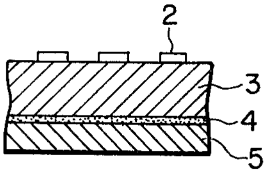
Figure 7:
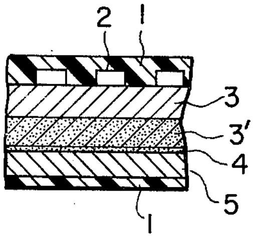
Figure 8:
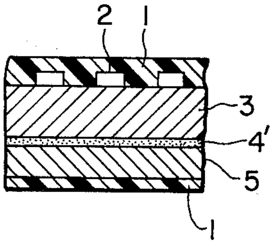
Figure 9:
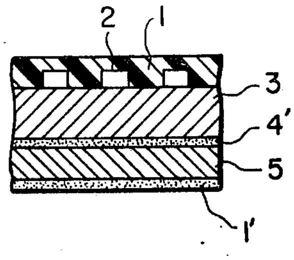
Figure 10:
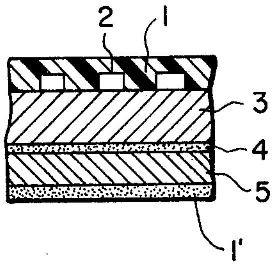
Figure 11:
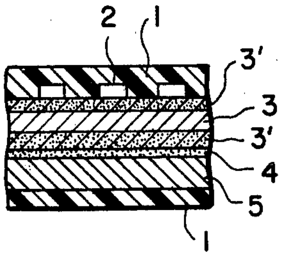
Figure 12:
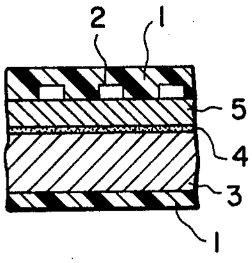
Figure 13:
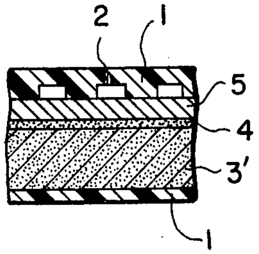
Figure 14:
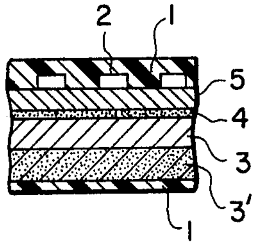

A backing paper of the layer construction as illustrated in FIG. 5 wherein an aluminum paste layer 5, comprising flaked aluminum particles having a diameter of about 20μ and a thickness of about 0.2μ, was provided on a support 3, and its characteristics were measured and compared with those of Conventional Backing Paper Nos. 1 and 2, under the same condition as Example 1.

The backing paper of this invention comprised the support 3 which was a bleached kraft paper having a thickness of 50μ, a print layer 2 provided on the support lever 3. a 2μ thick protective layer 1 comprising polymethyl methacrylate provided on the print layer 2, and the aluminum paste layer 5 at a thickness of 40μ provided on the reverse side of the support 3. The aluminum paste layer 5 was formed by melt-extrusion coating low density polyethylene with 5% by weight of aluminum powder and 5% by weight of carbon black dispersed therein.

The backing paper of this invention and Conventional Backing Paper Nos. 1 and 2 were compared under the same conditions as Example 1 and the results are shown in Table 2.

The results are almost the same as those indicated in Table 1 and it is noted that the production cost of the backing paper of this invention is only one-half that of Conventional Backing Paper No. 2.

TABLE 2

| | Backing Paper of This Invention | Conventional Backing Paper No. 1 | Conventional Backing Paper No. 2 |
|---|---|---|---|
| Layer Construction | Illustrated in FIG. 5 | Illustrated in FIG. 15 | Illustrated in FIG. 16 |
| Total Thickness (μ) | 92 | 110 | 105 |
| Antistatic Properties | ○ | ○ | Δ |
| Light-shielding Properties | ⊚ | ○ | ⊚ |
| Moisture Barrier Characteristics (g/m² 24 hours) | 21 | 1050 | 58 |
| Bending Stiffness (g · cm) | 1.5 | 6.1 | 2.1 |
| Adhesion between Film and Backing Paper after being allowed to stand at 50° C., 80% for 3 days | ⊚ | X | ○ |
| Printing Properties | ⊚ | ○ | ○ |
| Dimensional Stability | ⊚ | ○ | Δ |
| Cost Ratio | 50 | 70 | 100 |

EXAMPLE 3

Figure 4:
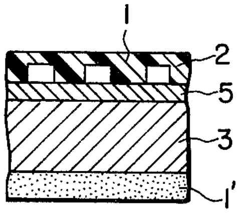

A backing paper of the layer construction as illustrated in FIG. 4 wherein an aluminum powder-dispersed layer 5 was provided on a support 3, and its characteristics were measured and compared with those of Conventional Backing Paper Nos. 1 and 2 under the same conditions as Example 1 or 2.

The backing paper of this invention comprised the support 3 which was a half-bleached kraft paper having a thickness of 60μ, an aluminum powder containing resin layer 5 having a thickness of 20μ provided on the support 3, a print layer 2 provided on the aluminum layer 5, a 2μ thick protective layer 1 comprising polyethyl methacrylate provided on the print layer 2, and a protective layer 1' having a thickness of 18μ provided on the reverse side of the support 3. The aluminum layer 5 was formed by melt-extrusion coating low density polyethylene with 6% by weight aluminum powder.

The protective layer 1' was formed by melt-extrusion coating ethylene-ethyl acrylate resin (ethyl acrylate content: 20% by weight) containing 10% by weight carbon black to provide a light-shielding property.

The backing paper of this invention and Conventional Backing Paper Nos. 1 and 2 were compared under the same conditions as in Example 1 or 2. The results are shown in Table 3.

TABLE 3

| | Backing Paper of This Invention | Conventional Backing Paper No. 1 | Conventional Backing Paper No. 2 |
|---|---|---|---|
| Layer Construction | Illustrated in FIG. 4 | Illustrated in FIG. 15 | Illustrated in FIG. 16 |
| Total Thickness (μ) | 100 | 110 | 105 |
| Antistatic Properties | ○ | ○ | Δ |
| Light-shielding Properties | ○ | ○ | ⊚ |
| Moisture Barrier Characteristics (g/m² 24 hours) | 35 | 1,050 | 58 |
| Bending Stiffness (g · cm) | 1.8 | 6.1 | 2.1 |
| Adhesion between Film and Backing Paper after being allowed to | ○ | X | ○ |

TABLE 3-continued

| | Backing Paper of This Invention | Conventional Backing Paper No. 1 | Conventional Backing Paper No. 2 |
|---|---|---|---|
| stand at 50° C., 80% for 3 days | | | |
| Printing Properties | ◎ | ○ | ○ |
| Dimensional Stability | ◎ | ○ | Δ |
| Cost Ratio | 55 | 70 | 100 |

EXAMPLE 4

A backing paper having the layer construction as illustrated in FIG. 4, wherein an aluminum vapor-deposited layer 5 was provided on support 3, and its characteristics were measured and compared with those of Conventional Backing Papers Nos. 1 and 2 under the same conditions as in Examples 1, 2 and 3.

The backing paper of this invention comprised the support 3 which was a half-bleached kraft paper having a thickness of 60μ, a 500 Å thick aluminum vapor deposited layer 5 provided on the support 3, a print layer 2 provided on the aluminum vapor deposited layer, a 15μ thick protective layer 1 comprising low density polyethylene provided by melt-extrusion coating on the print layer 2, and a protective layer 1' having a thickness of 15μ on the reverse side of the support 3.

The protective layer 1' was formed by melt-extrusion coating ethylene-ethyl acrylate resin (ethyl acrylate content: 18% by weight) with 3% by weight carbon black and 3% by weight aluminum paste, to provide a light-shielding property.

The backing paper of this invention and Conventional Backing Paper Nos. 1 and 2 were compared under the same conditions as in Examples 1, 2 and 3, and the results are shown in Table 4.

The results are comparable to those indicated in Table 1 and it is noted that the production cost of the backing paper of this embodiment of the invention is only one-half that of Conventional Backing Paper No. 2 and is about 70% that of the embodiment of the present invention shown in Example 1.

TABLE 4

| | Backing Paper of This Invention | Conventional Backing Paper No. 1 | Conventional Backing Paper No. 2 |
|---|---|---|---|
| Layer Construction | Illustrated in FIG. 4 | Illustrated in FIG. 15 | Illustrated in FIG. 16 |
| Total Thickness (μ) | 90 | 110 | 105 |
| Antistatic Properties | ◎ | ○ | Δ |
| Light-shielding Properties | ◎ | ○ | ◎ |
| Moisture Barrier Characteristics ($g/m^2$ 24 hours) | 1.1 | 1,050 | 58 |
| Bending Stiffness (g · cm) | 1.3 | 6.1 | 2.1 |
| Adhesion between Film and Backing Paper after being allowed to stand at 50° C., 80% for 3 days | ◎ | X | ○ |
| Printing Property | ◎ | ○ | ○ |
| Dimensional Stability | ◎ | ○ | Δ |
| Cost Ratio | 50 | 70 | 100 |

As can be seen from the results, the backing paper of this invention produces the following advantages:

(1) High moisture resistance and gas-shielding properties reduce the degradation in film quality (for example, an increase in fog), troubles encountered in bonding together a film and a backing paper, and so on.

(2) The use of white paper becomes possible and the finish of print is greatly improved.

(3) The production cost is reduced.

(4) Since an aluminum layer is used as a light-shielding layer, there is obtained a backing paper which is thin and flexible, less subject to loose winding, and has good suitability for being fitted in a holder of a camera.

(5) Since the formation of static charge is reduced, the speed of processes such as cutting and wrapping could be increased, and thus productivity is increased.

(6) When an aluminum foil is used as an aluminum layer, the dimensional stability is increased in comparison with those backing papers comprising mainly paper, and the shrinkage due to dryness is reduced.

While the invention has been described in detail and with reference to specific embodiments thereof, it will be apparent to one skilled in the art that various changes and modifications can be made therein without departing from the spirit and scope thereof.

What is claimed is:

1. In a method for light-shielding a roll photographic film comprising overlaying a backing paper on the roll photographic film and winding together said roll photographic film and backing paper, with the backing paper being located exterior to the roll film, the improvement which comprises the backing paper comprising a support; a print layer and at least one aluminum layer provided on the support, said backing paper being 50μ to 150μ in total thickness.

2. In a method for light-shielding a roll photographic film as in claim 1 wherein the at least one aluminum layer is an aluminum paste layer provided on the support, in which the aluminum paste is dispersed and fused and casted with thermoplastic resin, and said aluminum paste layer having a thickness of 5μ to 40μ.

3. In a method for light-shielding a roll photographic film as in claim 1 wherein the at least one aluminum layer is aluminum powder-dispersed layer provided on the support, in which the aluminum powder dispersed layer is fused and casted with thermoplastic resin and having a thickness of 5μ to 20μ.

4. In a method of light-shielding a roll photographic film as in claim 1 wherein the at least one aluminum layer is an aluminum foil layer of 3μ to 30μ thickness provided on the support.

5. A method for light-shielding a roll photographic film as in claim 1, wherein the backing paper comprises a protective layer, a print layer, a support and an aluminum layer overlaid in this order.

6. A method for light-shielding a roll photographic film as in claim 5, wherein at least one of the support, the protective layer and the adhesive layer contains a light-shielding agent.

7. A method for light-shielding a roll photographic film as in claim 1, wherein the backing paper comprises a print layer, a support, an adhesive layer and an aluminum layer overlaid in this order.

8. A method for light-shielding a roll photographic film as in claim 7, wherein at least one of the support, the protective layer and the adhesive layer contains a light-shielding agent.

9. A method for light-shielding a roll photographic film as in claim 1, wherein the backing paper comprises a print layer, a support, an adhesive layer, an aluminum layer and a protective layer overlaid in this order.

10. A method for light-shielding a roll photographic film as in claim 9, wherein at least one of the support, the protective layer and the adhesive layer contains a light-shielding agent.

11. A method for light-shielding a roll photographic film as in claim 1, wherein the backing paper comprises a protective layer, a print layer, an aluminum layer, a support and a protective layer overlaid in this order.

12. A method for light-shielding a roll photographic film as in claim 11, wherein at least one of the support, the protective layer and the adhesive layer contains a light-shielding agent.

13. A method for light-shielding a roll photographic film as in claim 1, wherein the backing paper comprises a first protective layer, a print layer, a support, an adhesive layer, an aluminum layer and a second protective layer overlaid in this order.

14. A method for light-shielding a roll photographic film as in claim 13, wherein at least one of the support, the protective layer and the adhesive layer contains a light-shielding agent.

15. A method for light-shielding a roll photographic film as in claim 1, wherein the backing paper comprises a first protective layer, a print layer, an aluminum layer, an adhesive layer, a support and a second protective layer overlaid in this order.

16. A method for light-shielding a roll photographic film as in claim 15, wherein at least one of the support, the protective layer and the adhesive layer contains a light-shielding agent.

* * * * *